June 3, 1952            A. O. KIRMAN            2,599,332
THERMOPITCHER
Filed Aug. 2, 1949
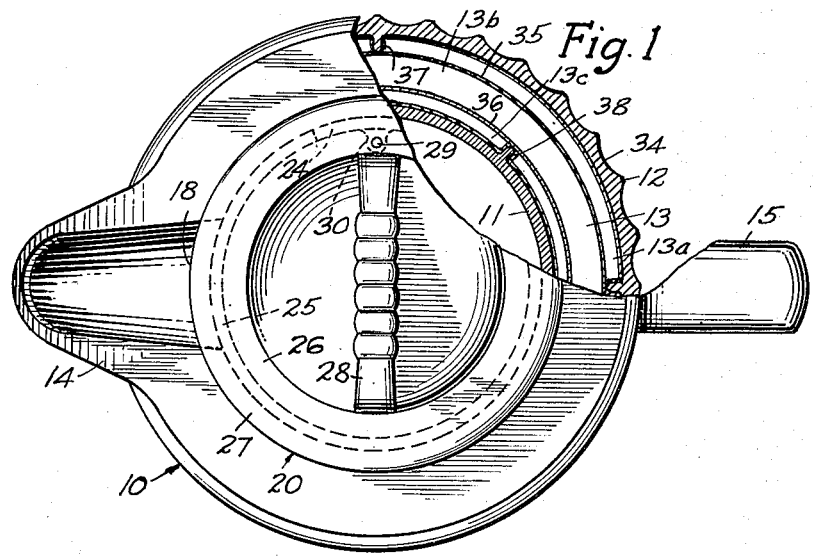
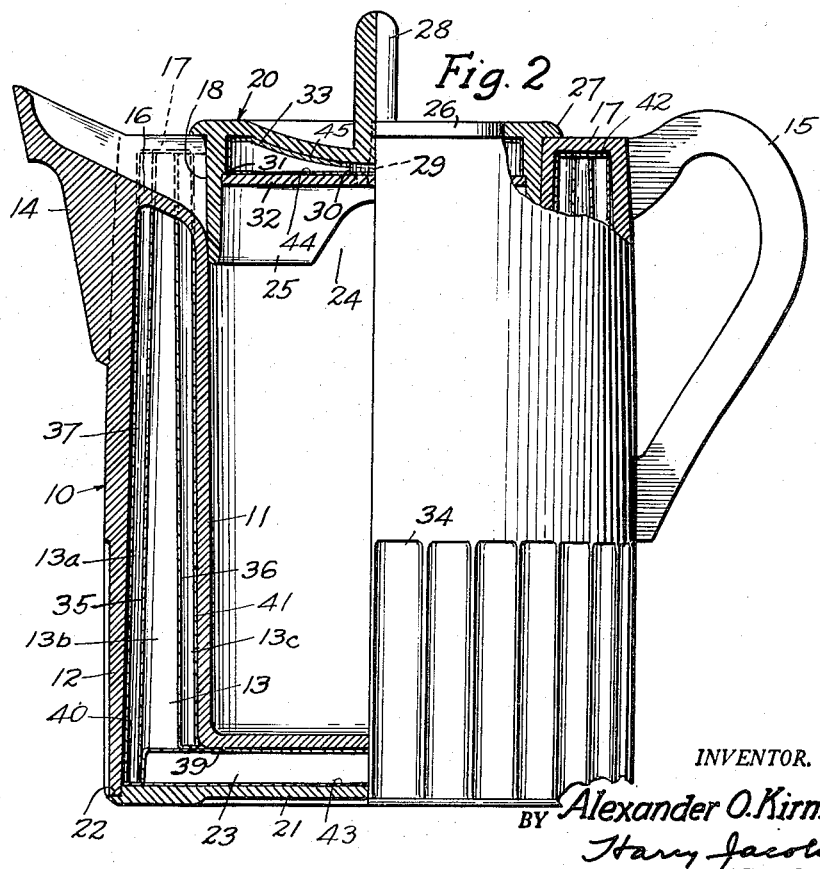
INVENTOR.
Alexander O. Kirman
BY Harry Jacobs
ATTORNEY Patented June 3, 1952

2,599,332

UNITED STATES PATENT OFFICE 2,599,332

THERMOPITCHER

Alexander O. Kirman, New York, N. Y., assignor to Thermoplex International, Inc., New York, N. Y., a corporation of New York Application August 2, 1949, Serial No. 108,100

4 Claims. (Cl. 65—66)

This invention relates to pitchers designed to maintain a beverage against substantial change in temperature until dispensed and relates particularly to thermo-pitchers, the greater part of which may be molded in one piece and in one operation.

The invention contemplates the provision of a relatively inexpensive thermo-pitcher having a one piece moldable body comprising an inner container and an outer casing in outward spaced relation and integrally joined to the container by a top annular wall, the spout and the opposed handle being integrally molded with the container and casing and the bottom of the pitcher being separate but easily secured in place to permit the insertion or arrangement of insulating material in the insulating space between the container and the casing, or the evacuation of air therefrom.

The invention further contemplates the provision of a light-weight thermo-pitcher of good appearance and adapted for use in restaurants, hotels, bars, offices and at the dining table to keep hot or cold beverages without change in temperature for a substantial time and until the beverage is poured out, the open body of the pitcher being inexpensively moldable in one operation of suitable synthetic plastic material of the type which is resistant to heat and cold.

The invention further contemplates the provision of a thermo-pitcher adapted to be molded in one piece with an inner container, an outer casing, an insulating space therebetween, a spout and a handle, and into which space suitable insulating material may readily be inserted and the space then effectively and economically sealed, the container being open at the top and normally closed as by a removable molded insulating cover designed to operate as a rotary valve to permit dispensing of liquid from the pitcher through its spout.

The invention further contemplates the provision of a one piece body molded with an insulating space therein which is provided with insulating partitions separating the space into non-communicating component parts constituting compartments.

The various objects of the invention will be clear from the description which follows and from the drawings, in which:

Fig. 1 is a top plan view combined with a partial horizontal sectional view taken on a plane below the handle of the thermo-pitcher, the cover being shown in its normal top-sealing position, Fig. 2 is a combined side elevational and vertical sectional view of the pitcher showing the cover in the same top-sealing position as in Fig. 1.

In the practical embodiment of the invention shown herein by way of example, the main body 10 of the pitcher is molded in one piece and comprises the inner container 11, the outer casing 12 spaced outwardly as by the space 13 from and concentric with the container, the pouring spout 14 and the handle 15. The upwardly and outwardly inclined bottom wall 16 of the spout forms a depressed portion of the top annular wall 17 integrally joining the upper parts of the container and casing and closing the top of the space 13. The spout projects outwardly beyond the casing 12 and communicates at its inner end with the interior of the container 11 through the port 18 in the wall of the container when permitted to do so by the cover 20, the skirt of which normally seals the port. The bottom 21 of the pitcher is preferably made as a disc-like piece separate from the body 10 and is preferably secured in place at its peripheral shoulder 22 to the bottom edge of the outer casing 12 by suitable cement, the shoulder covering said bottom edge. The pitcher bottom 21 also serves to protect the container bottom by providing the insulating space 23 therebetween.

It will be noted that by the construction described, the container 11 is in effect suspended within and in inward spaced relation to the casing 12, being integrally joined thereto only at the top by the wall 17, part of which wall is depressed to form the port 18 communicating with the spout 14 and also to form the bottom of the spout. The open top of the container is normally closed by the rotatable and completely removable cover 20 which is ordinarily removed only when the container is to be filled or cleaned. For dispensing purposes, the cover need not be removed, the side dispensing opening 24 being provided in the depending skirt 25 of the cover. An outstanding flange 27 at the periphery of the top 26 of the cover is designed to rest on the wall 17 with the skirt 25 closely fitting the top part of the inner surface of the container. The upstanding relatively thin and wide handle 28 provides a means for easily manipulating the cover to carry the opening 24 into registration with the port 18 and thereby to open communication between the spout 14 and the interior of the container. The handle 28 is arranged radially across the top of the cover at the opening and therefore serves as a means for indicating the position of the dispensing opening. To permit the contents of the container to be replaced by air as dispensing proceeds, a small vent opening 29 is made through the projection 30 extending inwardly of the skirt 25, and through the top 26.

An insulating space is formed in the cover by providing the skirt 25 with an inwardly extending annular shoulder 31 above the opening 24 and below the top 26. Secured as by cement to the shoulder to form the insulating space 33 is the bottom partition 32. The pitcher handle 15 is preferably molded integrally with the casing 12 in a manner which is well understood, and its ends are integral with the casing and hence separated from the container by the insulating space 13. Said space therefore insulates the handle from the hot or cold liquid in the container and no special insulating handle is needed. The handles 15 and 28 as well as the spout 14 and the outer surface of the casing are adapted to be molded into pleasing configurations and also to receive molded surface ornamentation if desired, such as the flutes 34 shown around the lower part of the casing.

It will be understood that the spaces 13, 23 and 33 are important features of the invention in that the requisite heat insulation of the contents of the container 11 from the outer air is made possible thereby in an adequate and inexpensive manner. Such insulation may take various forms, such as air left in the spaces and sealed therein away from access to the outside. Or suitable heat insulating material of any well known type such as ground cork, or fibrous matter such as cotton or the like or light-weight cellular material such as expanded vermiculite or perlite may substantially fill the spaces and retard the passage of heat to and from the container and its contents. However, as shown, substantially cylindrical and preferably concentric and spaced apart bright metallic foil partitions 35 and 36 are used to divide the space 13 into smaller spaces 13a, 13b and 13c closed off from each other, the foil serving to reflect back most of the heat attempting to pass through the partitions from one compartment to the other and thereby aiding in maintaining constant the temperature of the contents of the container. The foil partition 35 is supported by and rests against the circumferentially spaced inwardly extending ribs 37 projecting from the inner surface of the casing 12, while the foil partition 36 is similarly supported and rests against the ribs 38 projecting outwardly from the outer surface of the container 11 and alternating with the ribs 37. Preferably, all of the interior surfaces of the body 10 and of the cover 11 including the bottom 21 and the partition 32 of the cover are covered with foil to assist in preventing heat transfer. For example, the foil sheet 39 is secured to the lower end of the partition 36 and to the under side of the bottom 22 of the container and serves in addition to its heat-reflecting function, as a closure to cut off the compartment 23 from the compartments 13b and 13c. The sheet 40 covers the inner surfaces of the casing and its ribs, the sheet 41 covers the outer surface of the container and its ribs, the annular sheet 42 covers the inside surface of the wall 17 and the sheet 43 covers the inside surface of the disc bottom 21. Similarly, the foil sheets 44 and 45 cover the inside surfaces of the cover as best seen in Fig. 2.

The foil may be secured in place in any suitable manner as by adhesive and is sufficiently stiff to maintain its shape and position during ordinary use and handling of the pitcher. However, the foil and other insulating material may obviously be omitted from the insulating spaces and the air evacuated instead as hereinbefore indicated.

It will now be seen that the thermo-pitcher forming the subject matter of this invention is of simple but efficient construction; that the container, casing, spout and handle may readily be molded in one operation and of a single piece of synthetic plastic material to provide a light-weight pitcher; that provision is made therein for various types of heat insulation as desired; that the foil partitions illustrated from a simple, inexpensive but effective heat insulating means; that the handle is insulated from the container and hence does not get too hot to manipulate and needs no special insulation; that the insulated cover forms an adequate rotary valve for dispensing purposes without the necessity for the removal thereof and that the various problems involved in the construction of thermo-pitchers have been adequately met so that the pitcher is well designed for its intended purposes.

While I have shown and described a certain specific embodiment of the invention, various obvious changes may be made therein without departing from the spirit of the invention defined in the appended claims.

I claim:

1. In a thermo-pitcher, a one-piece body molded of synthetic plastic and having an inner container closed at the bottom thereof and open at the top thereof, an outer casing in outward concentric spaced relation to the container and open at the bottom thereof, a flat disc-like closure for said open bottom designed to contact a supporting surface over a substantial area and a spout connecting the top portions of the container and casing and communicating with the interior of the container, said spout constituting a depressed part of an annular wall joining the tops of the container and casing beyond the spout, there being an annular heat-insulating space between the container and the casing, an upright metallic foil partition in and dividing the space into non-communicating compartments, ribs projecting inwardly from the inner surface of the casing into the space and supporting the partition, additional ribs projecting outwardly from the outer surface of the container and alternating with the respective first-mentioned ribs, a second upright foil partition supported by the additional ribs, and a rotary separable cover for the open top of the container having an imperforate depending cylindrical skirt in contact with and riding on the inner surface of the container and extending below the depressed part of the annular wall, said skirt being provided with an opening adapted to be moved into register with the inner end of the spout or out of register therewith for closing same, the outer surface of the skirt normally lying flush with the inner wall of the container at said depressed part of the annular wall.

2. In a thermo-pitcher, a one-piece body having an inner container, a casing surrounding the container and having a disc-like flat bottom thereon of a separate piece of material, there being an insulating space between the container and the casing, an annular wall joining the tops of the container and the casing and bridging said space, said wall being depressed at a selected part thereof and the container and casing being correspondingly recessed at the depressed part of the wall, a spout projecting from the casing at the depressed part of the wall and communicating with the interior of the container, ribs projecting from the casing and the container into said space, the casing ribs alternating with the container ribs, metallic foil partitions in spaced relation to each other and to the casing and container held in place by the respective casing and container ribs and dividing the space into non-communicating compartments, a handle on the body integral with the casing and a rotary separable cover for the container having a top provided with a peripheral flange normally resting on the annular wall, and a depending skirt provided with a side opening adapted to register with the inner end of the spout and long enough normally to close said inner end from communication with the container, the cover having a partition therein above the bottom of the skirt and below the top to form a compartment therein, and metallic foil linings on the interior surfaces of the casing and cover compartment and on the outer surfaces of the container.

3. In a thermo-pitcher, a one-piece body molded of synthetic plastic and comprising a cylindrical inner container closed at the bottom thereof and open at the top, a cylindrical outer casing in outward concentric spaced relation to the container and open at the bottom thereof, a flat disc bottom for the casing of a separate piece of plastic material in downward spaced relation and parallel to the container bottom, said disc bottom having a peripheral shoulder engaging the lowermost end edge of the casing and adhesively secured thereto and closing the otherwise open bottom of the casing, a substantially flat annular top wall integral with and joining the upper edges of the container and the casing, said wall having a depression at a selected part thereof, the container and casing being shorter at said depression than at the respective remainders thereof and the depressed part of the wall integrally connecting the shortened upper ends of the casing and the container, said wall extending upwardly and outwardly from the depression thereof to a point above the flat part of the wall and outwardly of the casing and forming a spout, a first set of circumferentially spaced apart upright ribs extending outwardly from the outer lateral surface of the container toward the outer casing a lesser distance than that between the container and the casing, a second set of circumferentially spaced apart upright ribs extending inwardly from the inner lateral surface of the casing toward the inner container a lesser distance than that between the container and the casing, the respective ribs of the sets alternating with each other, a first cylindrical sheet of metal foil supported by the outermost edges of the first set of ribs in outward spaced relation to outer surface of the container, a second cylindrical sheet of metallic foil in outward spaced relation to the first sheet and supported by the second set of ribs, metallic foil lining the outer surface of the container, the inner surface of the casing, the under face of the container bottom and the upper face of the disc bottom, said first foil sheet extending from the lower surface of the annular wall to the upper surface of the disc bottom and the second sheet extending downwardly from the lower surface of the annular wall toward said disc bottom, and a cover for the open end of the container rotatable about a vertical axis and having a depending cylindrical skirt thereon extending to a point below the depression and contacting the inner surface of the container and rotatable thereon, said skirt having a cut-out portion adapted to register with the depression, said skirt closing the inner end of the spout against communication with the interior of the container on the rotation of the cover about the axis thereof to a selected position.

4. The thermo-pitcher of claim 3, the lower part of the skirt of the cover being reduced in thickness to provide a shoulder on the cover above the cut-out portion, a flat horizontal partition in downward spaced relation to the top of the cover and secured to the cover at the shoulder to form a compartment within the cover, metallic foil lining the cover compartment and an outwardly extending flat peripheral flange on the cover normally resting on the top surface of the annular wall except at the depression, the skirt of the cover normally forming an upright inner wall closing the spout at the inner end of the depression.

ALEXANDER O. KIRMAN.

REFERENCES CITED

The following references are of record in the file of this patent:

UNITED STATES PATENTS

| Number | Name | Date |
|---|---|---|
| Re. 19,362 | Justheim | Nov. 6, 1934 |
| 76,761 | Holmes | Apr. 14, 1868 |
| 121,500 | Engelbert et al. | Dec. 5, 1871 |
| 231,586 | Jones | Aug. 24, 1880 |
| 233,189 | Barrows | Oct. 12, 1880 |
| 596,965 | Field | Jan. 4, 1898 |
| 665,349 | Sewall | Jan. 1, 1901 |
| 921,729 | Paalen | May 18, 1909 |
| 1,180,812 | Wolf | Apr. 25, 1916 |
| 1,312,203 | Picard | Aug. 5, 1919 |
| 1,956,395 | Montgomery | Apr. 24, 1934 |

FOREIGN PATENTS

| Number | Country | Date |
|---|---|---|
| 135,574 | Great Britain | Nov. 25, 1918 |
| 245,300 | Italy | Feb. 23, 1936 |
| 531,147 | Germany | Aug. 5, 1931 |
| 614,120 | Germany | June 1, 1935 |
| 631,184 | France | Sept. 6, 1927 |